US008046701B2

(12) United States Patent
Chiu et al.

(10) Patent No.: US 8,046,701 B2
(45) Date of Patent: Oct. 25, 2011

(54) PEER TO PEER GESTURE BASED MODULAR PRESENTATION SYSTEM

(75) Inventors: Patrick Chiu, Menlo Park, CA (US); Qiong Liu, Milpitas, CA (US); John Boreczky, San Leandro, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 990 days.

(21) Appl. No.: 10/636,044

(22) Filed: Aug. 7, 2003

(65) Prior Publication Data
US 2005/0030255 A1 Feb. 10, 2005

(51) Int. Cl.
*G06F 3/00* (2006.01)
*G06F 3/048* (2006.01)

(52) U.S. Cl. ........ 715/761; 715/730; 715/737; 715/753; 715/863

(58) Field of Classification Search .......... 709/201–205, 709/214, 231–232, 863; 715/730, 737, 748, 715/751, 753, 761, 766, 863; 710/1
See application file for complete search history.

(56) References Cited

U.S. PATENT DOCUMENTS

| | | | | |
|---|---|---|---|---|
| 5,617,117 A | * | 4/1997 | Kataoka et al. | 345/157 |
| 5,634,018 A | * | 5/1997 | Tanikoshi et al. | 715/751 |
| 5,873,100 A | * | 2/1999 | Adams et al. | 707/204 |
| 6,072,476 A | * | 6/2000 | Harada et al. | 345/204 |
| 6,108,687 A | * | 8/2000 | Craig | 709/203 |
| 6,426,761 B1 | * | 7/2002 | Kanevsky et al. | 715/788 |
| 6,470,341 B1 | * | 10/2002 | Rekimoto | 707/10 |
| 6,674,403 B2 | * | 1/2004 | Gray et al. | 342/463 |
| 6,690,337 B1 | * | 2/2004 | Mayer et al. | 345/1.1 |

(Continued)

FOREIGN PATENT DOCUMENTS

JP 63-204315 A 8/1988

(Continued)

OTHER PUBLICATIONS

Kai Li, Han Chen, Yuqun Chen, Douglas W. Clark, Perry Cook, Stefanos Damianakis, Georg Essl, Adam Finkelstein, Thomas Funkhouser, Timothy Housel, Allison Klein, Zhiyan Liu, Emil Praun, Rudrajit Samanta, Ben Shedd, Jaswinder Pal Singh, George Tzanetakis, Jiannan Zheng, , *Early Experiences and Challenges in Building and Using a Scalable Display Wall System*, Department of Computer Science, Princeton University, Princeton NJ 08544; 7 pp.

(Continued)

*Primary Examiner* — Ba Huynh
*Assistant Examiner* — Nicholas Augustine
(74) *Attorney, Agent, or Firm* — Fliesler Meyer LLP

(57) ABSTRACT

A peer-to-peer modular presentation system is disclosed for providing improved presentations. The system includes a plurality of displays. Each display is associated with an input device, processor and input/output port. The plurality of displays may include static or mobile wherein each display is aware of the displays immediately surrounding it or of the displays in a remote site during a teleconference. A propagation direction may be configured for at least two of the displays in the system. Propagation may be initiated for multiple displays by generating a gesture input at one display. The gesture input will cause content to be presented in the particular display, and initiate propagation of content along the configured direction in neighboring displays. Content may be fed to a particular display through a stack or other memory that is associated with the display.

28 Claims, 8 Drawing Sheets

U.S. PATENT DOCUMENTS

| | | | | |
|---|---|---|---|---|
| 6,765,559 | B2* | 7/2004 | Hayakawa | 345/173 |
| 6,775,014 | B2 | 8/2004 | Foote | |
| 7,030,861 | B1* | 4/2006 | Westerman et al. | 345/173 |
| 7,031,651 | B2* | 4/2006 | McCormick et al. | 434/350 |
| 7,058,354 | B2* | 6/2006 | McCormick et al. | 434/350 |
| 7,058,891 | B2* | 6/2006 | O'Neal et al. | 715/730 |
| 7,065,553 | B1* | 6/2006 | Chesley et al. | 709/205 |
| 7,133,896 | B2* | 11/2006 | Ogdon et al. | 709/205 |
| 7,152,989 | B2* | 12/2006 | Radley-Smith | 362/104 |
| 7,171,475 | B2* | 1/2007 | Weisman et al. | 709/227 |
| 7,260,771 | B2 | 8/2007 | Chiu | |
| 7,624,166 | B2 | 11/2009 | Foote | |
| 2001/0024195 | A1 | 9/2001 | Hayakawa | |
| 2001/0044858 | A1* | 11/2001 | Rekimoto | 710/1 |
| 2002/0026478 | A1* | 2/2002 | Rodgers et al. | 709/205 |
| 2003/0030595 | A1* | 2/2003 | Radley-Smith | 345/1.3 |
| 2003/0085923 | A1* | 5/2003 | Chen et al. | 345/751 |
| 2004/0003039 | A1* | 1/2004 | Humphrey et al. | 709/204 |
| 2004/0039934 | A1* | 2/2004 | Land et al. | 713/200 |
| 2004/0098456 | A1* | 5/2004 | Krzyzanowski et al. | 709/204 |
| 2004/0098458 | A1* | 5/2004 | Husain et al. | 709/204 |
| 2004/0230668 | A1* | 11/2004 | Carnahan et al. | 709/217 |
| 2005/0210405 | A1* | 9/2005 | Ernst et al. | 715/792 |
| 2006/0146765 | A1* | 7/2006 | Van De Sluis et al. | 370/338 |

FOREIGN PATENT DOCUMENTS

| | | |
|---|---|---|
| JP | 2000-163193 A | 6/2000 |
| JP | 2000-242390 A | 9/2000 |
| JP | 2000-330531 A | 11/2000 |
| JP | 2001-265481 A | 9/2001 |

OTHER PUBLICATIONS

Thomas P. Moran, Patrick Chiu, William Van Melle, Gordon Kurtenbach, *Implicit Structures for Pen-Based Systems Within a Freeform Interaction Paradigm*, Xerox Palo Alto Research Center, Palo Alto, CA, Dec. 16, 1994, pp. 1-8.

Brad A. Myers, *Using Handhelds and PCs Together*, Communications of the ACM, vol. 44, No. 11, Nov. 2001, 34-41 pp.

Elin Ronby Pedersen, Kim McCall, Thomas P. Moran, Frank G. Halasz, *Tivoli: An Electronic Whiteboard for Informal Workgroup Meetings*, Interchi '93 Apr. 24-29, 1993, pp. 391-398.

Jun Rekimoto, *Pick-and-Drop: A Direct Manipulation Technique for Multiple Computer Environments*, Sony Computer Science Laboratory Inc., 3-14-13 Higashigotanda, Shinagawa-ku, Tokyo 141 Japan, 8 pp.

Peter Tandler, Thorsten Prante, Christian Muller-Tomfelde, Norbert Streitz, Ralf Steinmetz, *Connectables: Dynamic Coupling of Displays for the Flexible Creation of Shared Workspaces*, ACM 2001 pp. 11-20.

Jun Rekimoto, Yuji Ayatsuka, Kazuteru Hayashi, *Augment-able Reality: Situated Communication through Physical and Digital Spaces*, 8 pp.

Office Action dated Oct. 20, 2009 in Japanese Patent Application No. 2004-228753, 5 pages (including translation).

Myers, Brad A., et al., "Interacting at a Distance Using Semantic Snarfing," Ubicomp 2001, pp. 305-314, 2001.

Geiβler, Jörg, "Shuffle, throw or take it! Working Efficiently with an Interactive Wall," In *CHI 98 Conference Summary on Human Factors in Computing Systems* (Los Angeles, California, United States, Apr. 18-23, 1998). CHI '98. ACM, New York, NY, 265-266.

* cited by examiner

PEER TO PEER GESTURE BASED MODULAR PRESENTATION SYSTEM

FIELD OF THE INVENTION

The current invention relates generally to multimedia presentation systems, and more particularly to peer-to-peer gesture based modular presentation systems.

BACKGROUND OF THE INVENTION

Presenting slides is an integral part of many meetings and other events that involve communication. Currently, the standard set-up is to use a laptop computer or meeting room computer to show Microsoft Powerpoint slides or web-based slides in a single video projector.

There are several disadvantages inherent to the standard slide presentation scenario. First, as a presenter progresses through a series of slides, the slide previously displayed on a screen is completely replaced. An audience may not view the previous slide that relates to the slide currently displayed. Second, there is generally no interaction from audience members regarding slide content. Audience members may discuss slides with a presenter, but generally may not add content to a slide as it is being presented.

Some attempts have been made by prior art systems to improve on the traditional slide show. One simple system uses multiple displays to show the same output of a single computer. Current presentation systems typically use a laptop with a video output signal that shows a copy of the laptop's display on a video projector or a large wall display. In the Unix operating system, a display can be set to view a particular workstation that can be located anywhere on the network. More recently, popular technology such as VNC (Virtual Network Computing) and Microsoft Terminal Services Client allow one computer's display and keyboard/mouse input to control another computer.

In other prior art attempts, several displays have been tiled together to create a large high resolution display. An example of this work is disclosed in the Princeton Scalable Display Wall, Li, Kai, et al, "Early experiences and challenges in building and using a scalable display wall system", *IEEE Computer Graphics and Applications*, vol. 20 (4), pp 671-680, 2000. Since the resulting tiled display is intended to behave like a single large display, the spirit of such systems does not provide much improvement over existing systems.

More sophisticated systems allow separate display units to interact with each other. ConnecTables, as disclosed in "ConnecTables: Dynamic coupling of displays for the flexible creation of shared workspaces", Tandler, P. et al., *Proceedings of UIST '01*. ACM, New York, supports the dynamic coupling of displays for small tables having a display on top. This work has major limitations in that two tables must be physically moved together in order for them to be coupled. Additionally, only two displays can be connected at a time, and they must be connected in a front-edge-to-front-edge configuration. The two displays can either form a single surface or remain as two separate surfaces. When connected, the two users can work on computer applications and share data.

Prior art systems have improved over the standard slide presentation methods, but there is still a need for an improved presentation system. What is needed is a media presentation system that overcomes the limitations of the prior art.

SUMMARY OF THE INVENTION

A peer-to-peer modular presentation system (MPS) is disclosed for providing improved presentations. The system includes a plurality of displays. The plurality of displays may include static or mobile displays. In one embodiment, the static displays are screens suitable for displaying content, such as video monitors, plasma displays, overhead projectors, or other display mechanisms. The mobile displays may be any type of mobile display suitable for presenting content as displayed in the static displays, including laptop computers, notebook PCs, PDAs, cell phones, and other mobile devices having or associated with a display. The displays communicate with each other within a peer-to-peer type system in which there is no central server. In one embodiment, each display is aware of the displays immediately surrounding it or of the displays in a remote site during a teleconference. In an embodiment, a presenter may move content between displays by generating a gesture using an input device. The gesture input will initiate new content to be displayed in one display and initiate propagation of content along a direction in a neighboring display. Content may be fed to a particular display through a stack or other source associated with the display.

DETAILED DESCRIPTION

A peer-to-peer modular presentation system (MPS) is disclosed for providing improved presentations. The system includes a plurality of displays. The plurality of displays may include static or mobile displays. In one embodiment, the static displays are screens suitable for displaying content, such as video monitors, plasma displays, overhead projectors, or other display mechanisms. The mobile displays may be any type of mobile display suitable for presenting content as displayed in the static displays, including laptop computers, notebook PCs, PDAs, cell phones, and other mobile devices. The displays communicate with each other within a peer-to-peer type system in which there is no central server. In one embodiment, each display is aware of the displays immediately surrounding it or of the displays in a remote site during a teleconference. In an embodiment, a presenter may move content between displays by generating a gesture input. The gesture input will initiate new content to be displayed in one display and initiate propagation of content along a direction in a neighboring display. Content may be fed to a particular display through a stack or other source that is associated with the display.

Becoming increasingly common and affordable are wall displays with rear projectors and large plasma displays. Some of these displays, like modular furniture, can be rearranged for different types of meetings. In addition to large displays, people attending conferences and presentations often have laptop computers, notebook computers, and handheld devices. As attendees move around, their devices may move around with them. The MS of the present invention may manage presentations presented using modular and mobile displays.

Figure 1:
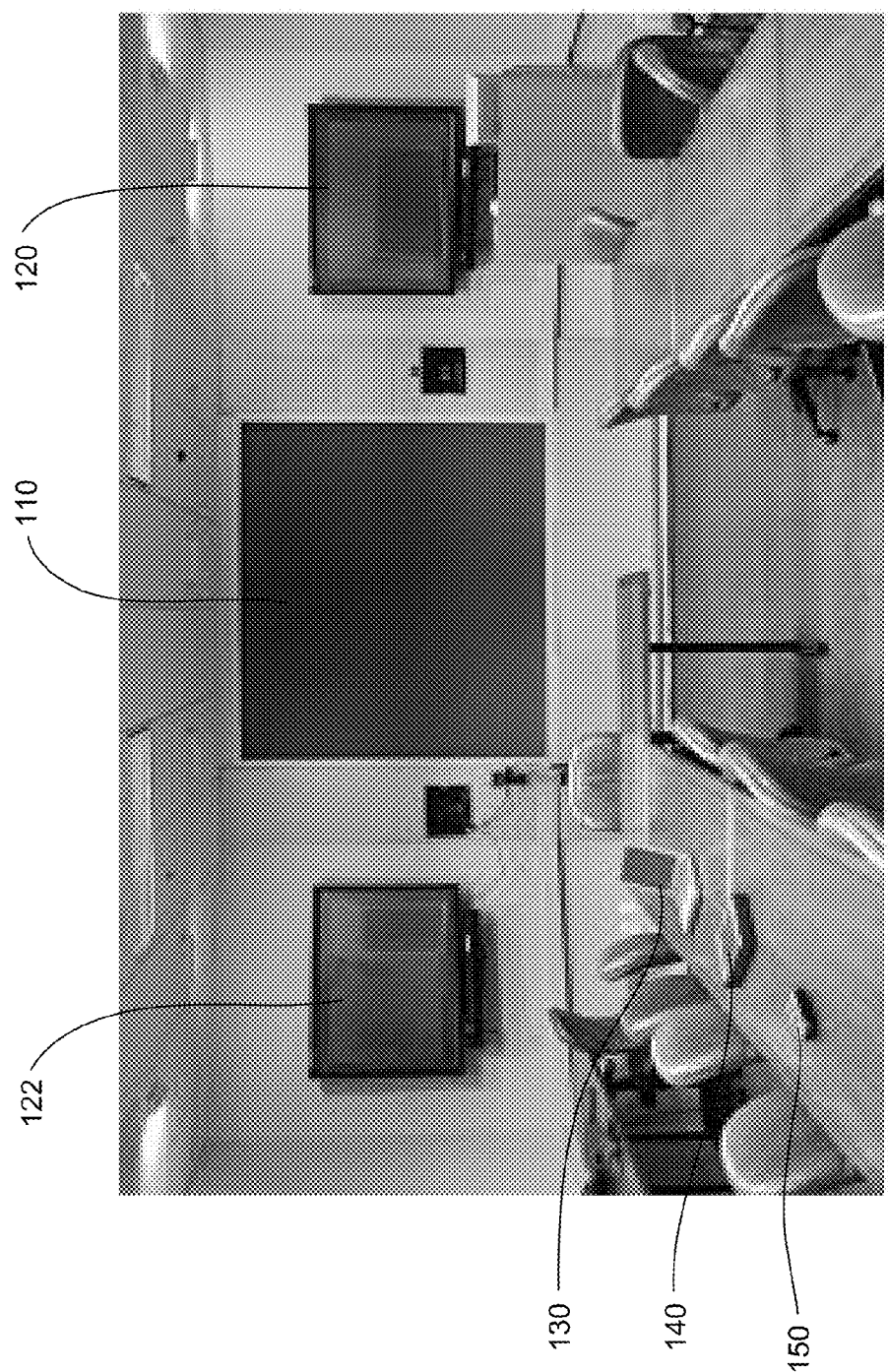
FIG. 1 is an illustration of an environment for which a modular presentation system may be used.

An illustration of an environment in which the MPS may be used is illustrated in FIG. 1. Environment 100 includes a central display 110, side displays 120 and 122, a notebook computer 130, a tablet PC 140, and a PDA 150. Elements 110 through 150 are illustrated as they may appear in a conference room setting. Generally, the displays 110-122 will be fixed while the mobile devices 130-150 may be moved throughout the environment. Propagation is used to transfer content from one display to another a display.

Content may be any type of media, including video, an image, text, audio, or some other type of media. In one embodiment, the content itself is located on a network. In this case, a display may be configured with the location of the content. Each display may then retrieve and present the content from the content location information. In one embodiment, the content location information includes a URL address of an image or video to be displayed. In this case, the media is retrieved from the URL address and presented on a display.

A gesture input indicates an action is to be taken regarding display content. A gesture input may indicate that a move content, delete content, transpose content or some other action is to be initiated. In one embodiment, a gesture may be entered on a touch screen. The touch screen may be a display showing content, such as touch screens 120 and 122 in FIG. 1, or some other touch screen. In this case, the gesture may be detected and characterized according to the direction and speed of the gesture. Another useful feature of a gesture that can be reliably detected on displays of different sizes is whether the gesture is made with a flick. For example, a move gesture may be a movement from right to left using a finger or hand across display 120 or 122 in FIG. 1. The gesture detected in the right to left direction may be characterized as a move gesture that initiates propagation of content from right to left. A gesture consisting of moving a finger from left to right on screen 122 or 120 may initiate content propagation from left to right. In addition to touch displays, gestures may be entered through other input devices such as keyboards, mouse devices, joysticks, microphones, UV sensors, motion detectors, laser pointers and other devices. Directional gestures may indicate propagation of content is to occur to the left, right, up, down, upper left, upper right, lower left, lower right, or some other direction. In another embodiment, the gesture may include characteristics indicating that content is to be moved to a display in three-dimensional coordinates.

When gesture input is received through a touch screen or similar device, the gesture can be recognized. In one embodiment, the gesture can be determined by looking at simple geometric features of the gesture path such as the width and height of the bounding box (the minimal box containing the entire gesture) and the location of the starting and ending points. The speed attribute is calculated by looking at the time difference between the endpoints of the gesture. The flick feature is calculated by looking for a significant increase in speed along the gesture's motion.

Different types of hardware are used to handle gesture input. Fingers can be used on wall displays with touch screens, such as the SMART Board for Plasma Displays. Some displays (e.g. video projectors) may not support gesture input, but they can still show slides and propagate gesture commands from adjacent displays. These displays may be associated with computers as well. A stylus is used for gesture input on mobile pen computers such as notebooks and handhelds. A mouse, other pointing device, or a touchscreen can be used to input gestures on a laptop. Also, remote control devices such as laser pointers or 3D mice may be used with both wall displays and mobile displays to provide input to a display.

Figure 2:
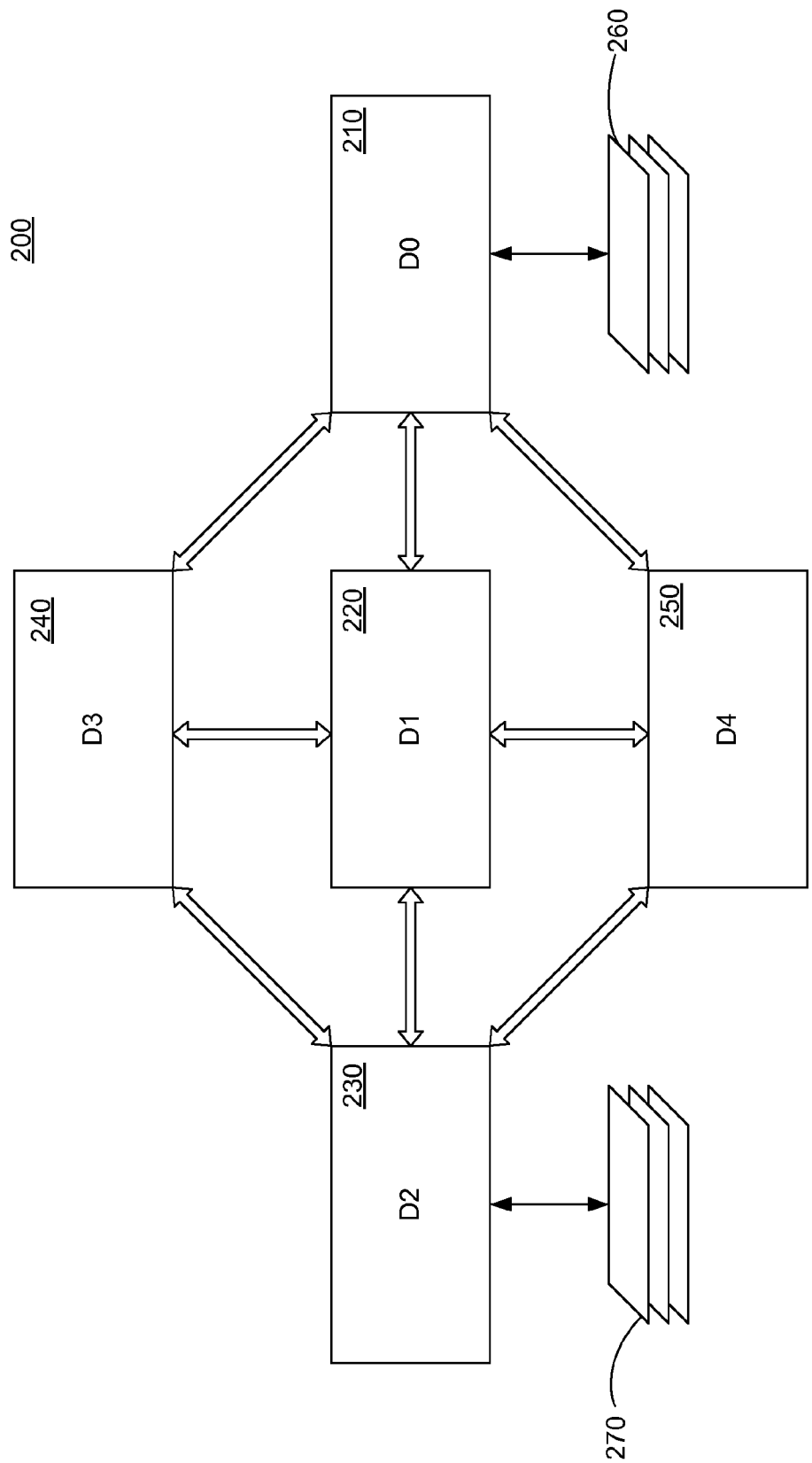
FIG. 2 is an illustration of a peer-to-peer display orientation in accordance with one embodiment of the present invention.

A display orientation 200 in accordance with one embodiment of the invention is illustrated in FIG. 2. Orientation 200 includes display D0 210, display D1 220, display D2 230, display D3 240, display D4 250, a stack 260 associated with display D0 and a stack 270 associated with display D2. Each of displays D0-D4 has a number of directional arrows between themselves and a neighboring display. The directional arrows indicate a direction in which content may propagate. In one embodiment, each display may be configured to propagate in a specific direction to a specific neighboring display or stack depending on a gesture input or request received from a neighboring display. In this embodiment, each display is configured with contact information with neighboring displays and the relative location of the display. Thus, display D2 in FIG. 2 would be configured to know that display D3 is to the upper right, display D1 is directly to the right, and D4 is to the lower right. Thus, propagation may occur from display D0 to D1 to D2 upon receiving a move content left gesture at display D0. In this case, since there is no display to feed display D0 new content, D0 would retrieve content from stack 260. Similarly, since display D2 would not be configured to propagate content to a neighbor in this example, display D2 would push it's current content to stack 270 to make room for content received from display D1. In one embodiment, each display may be associated with a stack of content. In another embodiment, each display is associated with a database or other source of data from which content identification information can be retrieved.

In one embodiment, a peer-to-peer network may include one or more propagation groups. In this case, content propagation would only occur within a group. Configuring propagation groups may be useful in a situation where displays cover a broad area, such as the front and back wall of a room, and propagation among all displays (including the back wall displays) would be a distraction to those viewing a presentation that focuses on the front wall displays. In this case, a group may preferably contain displays within physical and visual proximity. A direction of propagation may also be configured within a group. Thus, in FIG. 2, a propagation group may consist of displays D0, D1 and D2, with a propagation order from D0 to D1 and D1 to D2. In another embodiment, the propagation order will follow the direction of the gesture received by a display. Thus, if a "move left" gesture was received at display D0, content would propagate from D0 to D1 and from D1 to D2. If a "move up" gesture was received at display D4, content would propagate from D4 to D1 and from D1 to D3. In another embodiment where a propagation group includes only D0 and D1, a move left gesture received by display D0 will propagate content from D0 to D1 only. In this case, the previous content (or content information) presented by display D1 will be sent to a stack associated with display D1. A system of the present invention may be configured to propagate according to one or a combination of these methods, all of which are considered within the scope of the present invention.

In one embodiment, each display includes or is associated with a processor and memory system. Each processor is capable of running an instance of the MPS software. In one embodiment, the MPS software is a Java program application. The instances of the MPS may communicate with each other using XML-RPC, which is a Web Services standard. By using the Web Services infrastructure, the system can connect displays in distributed locations for teleconferences and other purposes.

The content collections or stacks are loaded and reside on a network. In one embodiment, the network is a collection of web servers. As discussed below, information regarding the content is passed between the displays rather than the content itself. This provides for quicker communication between displays. In one embodiment, the content identification information is the location of the content over the network. In the case where the network is a collection of web servers, the content information may be the URLs of the content. Since no media content or objects are passed around, a lightweight protocol such as XML-RPC is suitable for the MPS.

When non-fixed displays are supported, a registry for discovering the adjacent display is required. Location and orientation of the mobile displays can be determined using a variety of techniques, including ultrasound for direction as disclosed in "Special Issue: Location Based Computing", Want, IEEE Computer, volume 34, No. 8, August 2001, and digital compasses for orientation, such as the Dinsmore 1490 compass. This can be handled as a simple listing or a Web services registry. Other issues such as security and transactions can also leverage the technology for handling mobile displays in the emerging Web services infrastructure.

Figure 3:
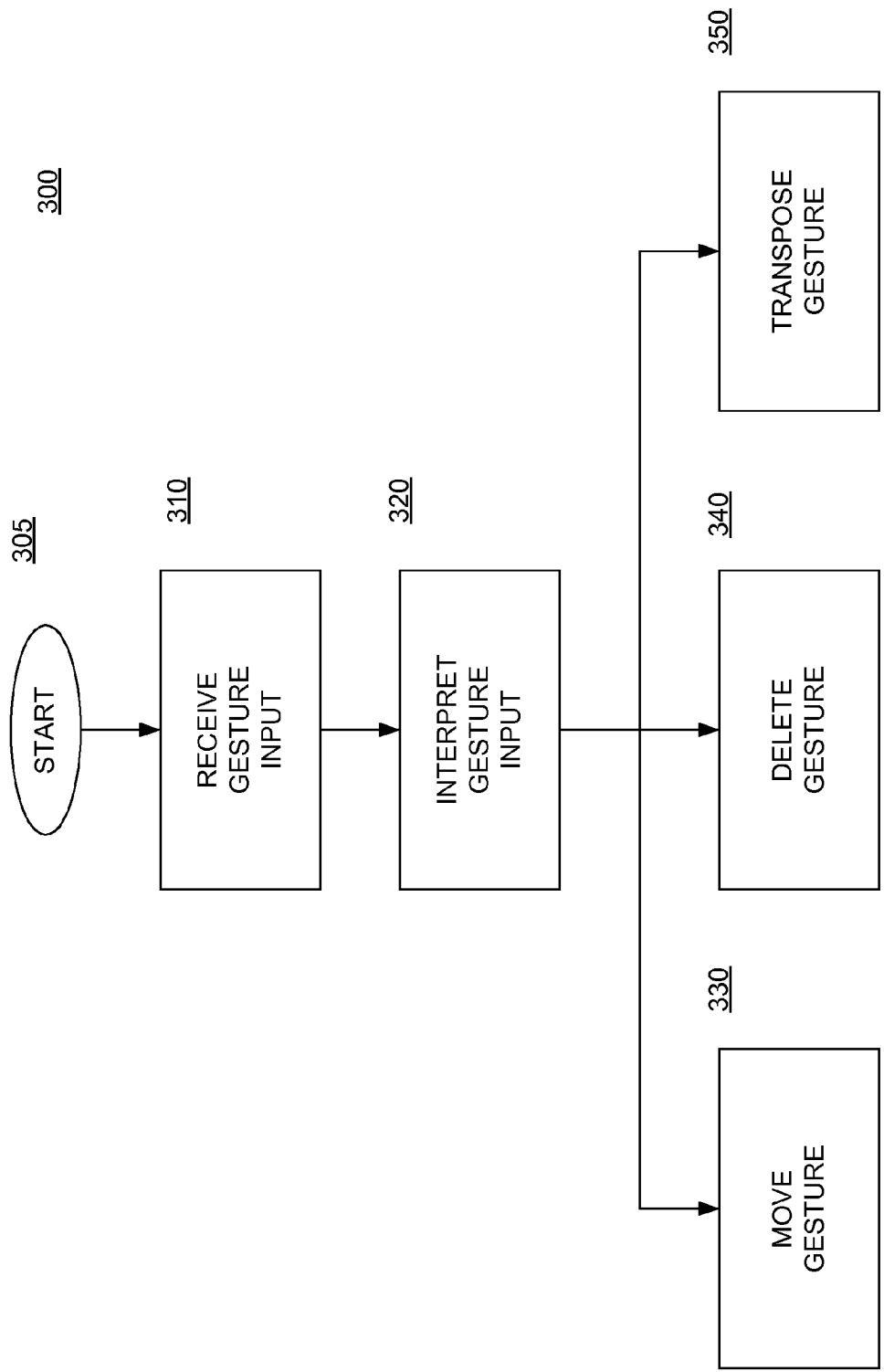
FIG. 3 is an illustration of a method for processing gesture inputs in accordance with one embodiment of the present invention.

Operation of the system in accordance with one embodiment of the present invention is illustrated in method 300 of FIG. 3. Operation 300 begins with start step 305. Next, a gesture is received at step 310. A gesture input may be received from an input device associated with the display. As discussed above, a gesture input may be received through devices including a touch screen, keyboard, mouse device, motion sensor, or other input device. Once a gesture is received, the gesture is interpreted at step 320. In an embodiment where the gesture is received through a touch screen or mouse device, the gesture may be analyzed using recognition software to determine the type, direction and acceleration or speed of the gesture. Once the direction and speed are interpreted, the gesture can be classified according to recognized types of gestures, such as move, delete, and transpose, as discussed above, or some other type of gesture. In another embodiment, a gesture input from a device such as a keyboard may be interpreted by comparing the received gesture input to a table of recognized gesture inputs. In any case, once the gesture is interpreted in step 320, operation continues depending on the interpretation of the gesture. In the embodiment illustrated in method 300, operation continues to step 330 if the gesture is determined to be a move gesture, to step 340 if the gesture is determined to be a delete gesture, and to step 350 if the gesture is determined to be a transpose gesture. If a received gesture input is not recognized, operation will return to step 310 (not shown). Though only three types of gestures are shown, they are for purposes of discussion only and other types of gestures for initiating actions upon content in the displays of the system are intended to be within the scope of the present invention.

Figure 4:
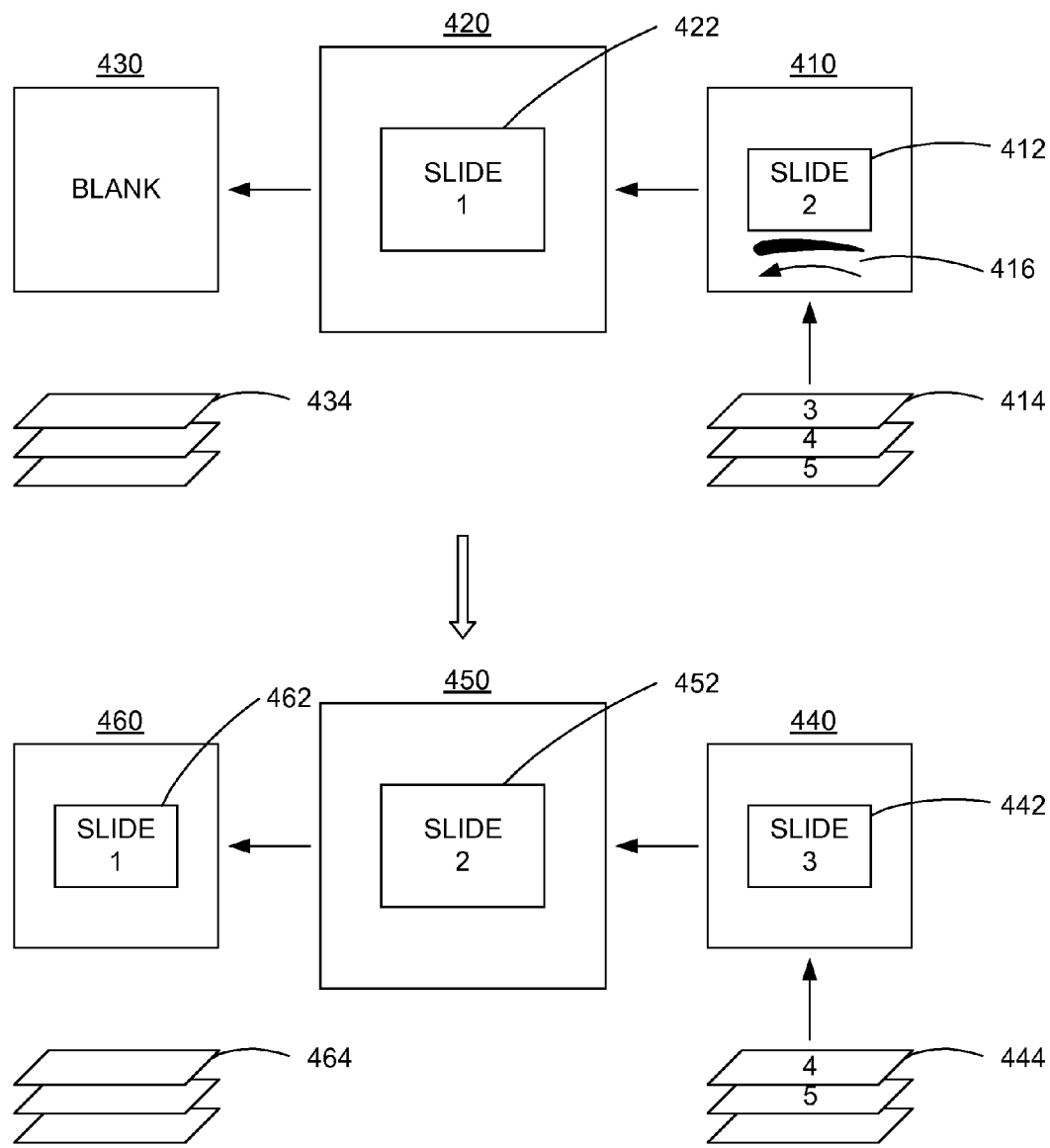
FIG. 4 is an illustration of propagation in response to a gesture in accordance with one embodiment of the present invention.

The effect of a move content left gesture received by a touch screen in a three display system 400 is shown in FIG. 4. The system of FIG. 4 includes displays 410, 420 and 430, displaying content 412, content 422, and no content, respectively. A move content gesture 416 is made on the display 410 in the right-to-left direction as indicated. The displays are configured to propagate in the right to left direction upon receiving this type of gesture as indicated by the arrows between them. A stack 414 is associated with display 410 and stack 434 is associated with display 430.

The effect of the move gesture received at display 410 is illustrated by the displays 440, 450, and 460. After the propagation has occurred, the content 412 displayed by right most display 410 is now displayed as content 452 in center display 450, and the content 422 displayed by center display 420 is now displayed as content 462 by leftmost display 460. Rightmost display 440 is now displaying content 442 which was retrieved from the top of stack 414. The content second from the top in stack 414 is now the content at the top of stack 444.

Figure 5:
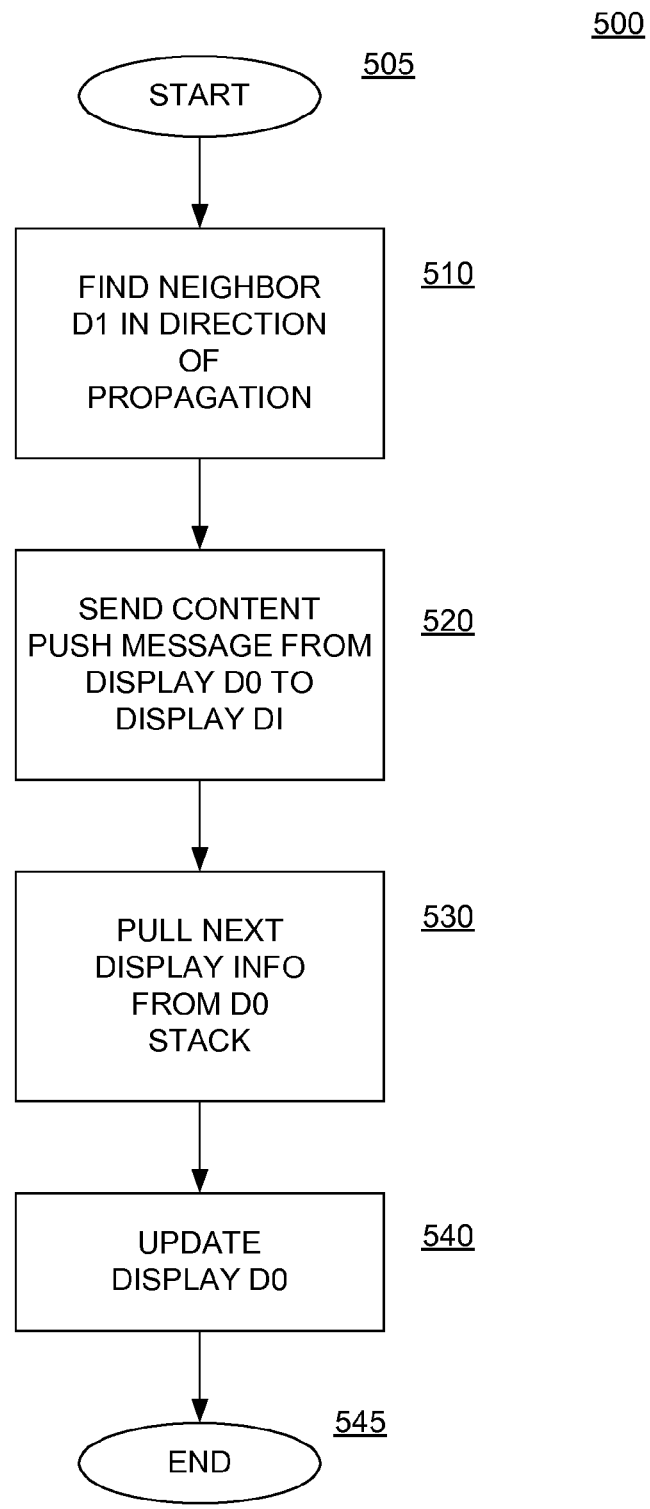
FIG. 5 is an illustration of a method for processing a move gesture by the gesture receiving display in accordance with one embodiment of the present invention.

Method 500 of FIG. 5 illustrates system operation once a gesture is interpreted to be a move gesture in method 300 of FIG. 3. Throughout the discussion of method 500, the display associated with the input device that received the gesture input is referred to as display D0, the first neighboring display is referred to as display D1, and the first neighboring display to D1 is referred to as D2. Method 500 begins with start step 505. Next, a neighboring display D1 in the direction of the propagation is determined relative to D0 at step 510. The direction of the propagation is determined from the gesture input (move left, move right, mover upper left, etc.). In one embodiment, a gesture may indicate that content is to be propagated in a way as to skip the nearest display and to propagate to the next display in the direction of propagation. In another embodiment, the source display may send two propagation commands instead of one, resulting in the content from display D0 propagating over two displays from the source display.

Once a neighbor display D1 in the direction of propagation is determined, a content push request is transmitted from display D0 to display D1 at step 520. In one embodiment, the content push request includes content identification information for the content to be pushed from the requesting display D0 to the display D1 in the direction of propagation. As discussed above, the content identification information may be a URL or some other type of location information. In an embodiment, the content push request may also include identification information for the display requesting the push.

After the content push message is sent at step 520, display D0 may "pull" or retrieve content identification display information from the D0 stack or other source of content identification information as shown in step 530. Once the content information is retrieved from the D0 stack, the display is updated to present the content associated with the information retrieved as shown in step 540. Operation of method 500 then ends at step 545.

Figure 6:
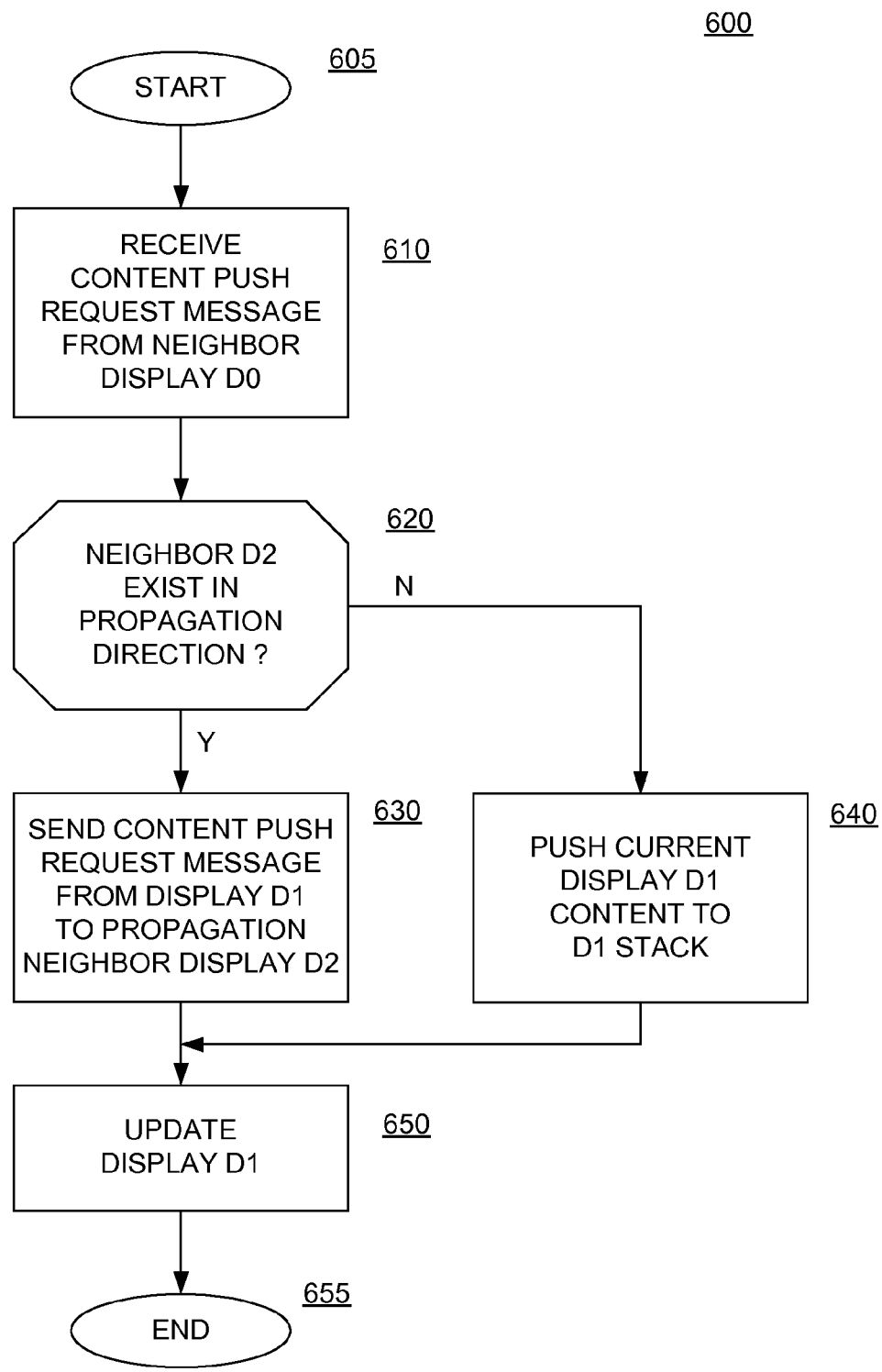
FIG. 6 is an illustration of a method for implementing propagation in response to a move gesture in accordance with one embodiment of the present invention.

In method 500, display D0 receives and interprets the move gesture and sends a push content request that is received by a display in the direction of propagation. The receiving display may be a neighboring display or a number of displays away in the direction of propagation. The display that receives the request performs a series of operations to update it's display, as do the other displays in the line of propagation. Method 600 of FIG. 6 illustrates how subsequent displays carry out the propagation of content in accordance with one embodiment of the invention. For discussion purposes with respect to method 600, the content push message will be assumed to have been sent by display D0, received by display D1, and the next display in the direction of propagation is D2.

Operation of method 600 begins with start step 605. Next, a display D1 receives the content push request message from a neighbor display D0 at step 610. As discussed above, the content push message may contain display identification information and content identification information. Next, the receiving display D1 determines whether a neighbor display D2 exists in the direction of propagation at step 620. As discussed above, propagation may occur in the direction indicated by the receive gesture or along a predetermined route. In an embodiment where propagation occurs in the direction indicated by the gesture, display D1 must determine which display, if any, to propagate content to.

If display D1 determines that a neighbor display D2 exists in the direction of propagation, then operation continues to step 630. If no display D2 exists in the direction of propagation, then operation of method 600 continues to step 640 where the current display (or the content identification information used by the display) of D1 is pushed to a stack associated with display D1. At step 630, display D1 sends a content push request message to the display D2 in the direction of propagation. The display D2 will then perform operations to process the request as described by method 600. At step 650, display D1 will update itself to display content associated with the content information received in the content push request message at step 610. Operation of method 600 then ends at step 655. Method 600 will be repeated for as many remaining displays are involved in the propagation initiated by the initial move gesture.

If a gesture is interpreted to be a delete gesture in method 300, the current content will be removed from the display in which the deleted gesture was received. The display will then present no content. In another embodiment, the display will present some default content indicating that the display is not presenting any material content, such as a screensaver or representative slide. In one embodiment, content information regarding the deleted content will be placed on the top of the stack associated with the particular display. In an embodiment, the deleted gesture affects only the display receiving the gesture. In this case, propagation is not triggered by a delete gesture.

When propagation is triggered and a display in the direction of propagation has a blank display, such as a display that previously received a delete gesture, propagation will end when content information is received by the blank display. In this embodiment, propagation does not continue because the blank display has no content information to forward to a neighboring display.

Figure 7:
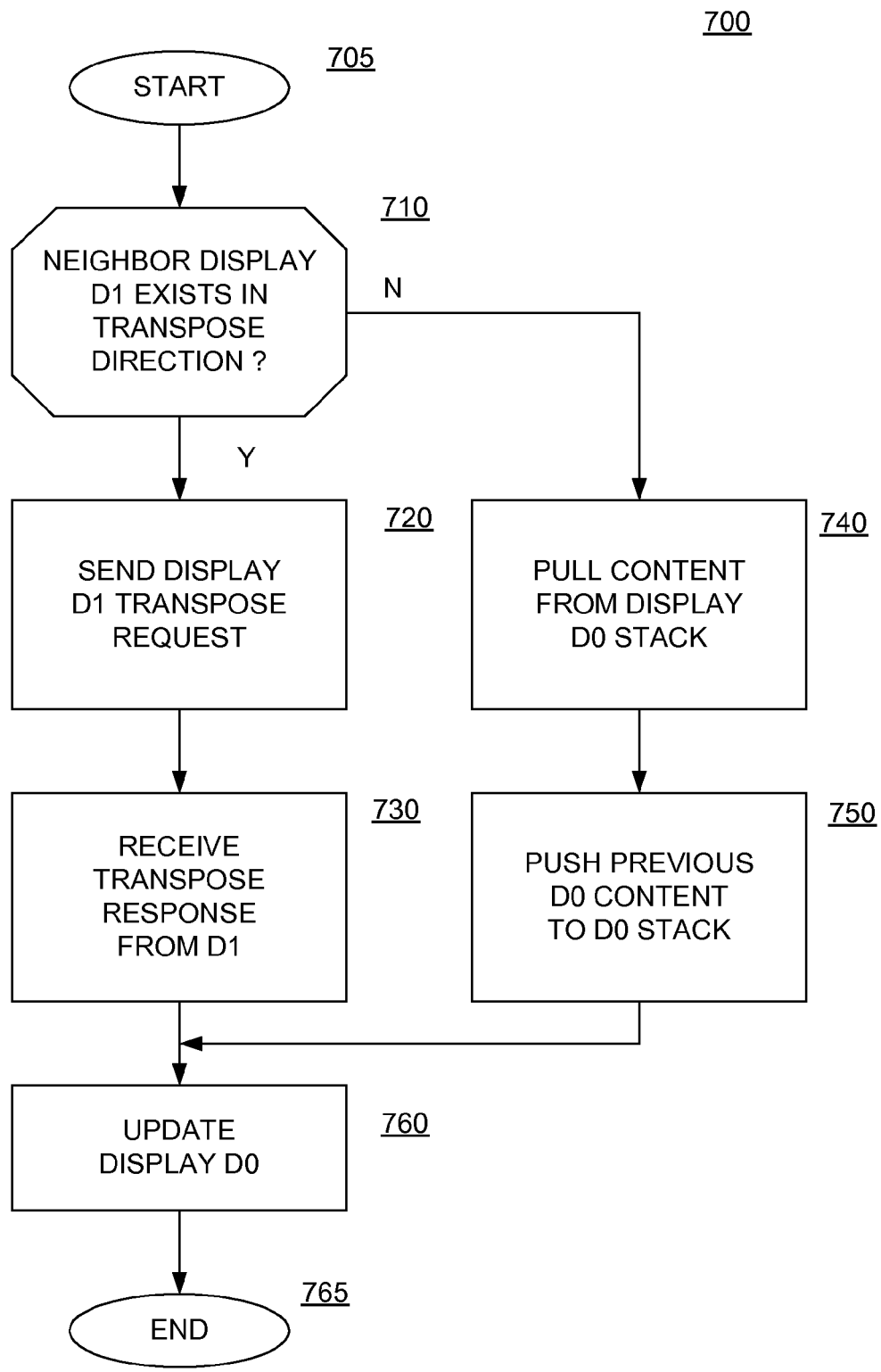
FIG. 7 is an illustration of a method for processing a transpose gesture by the gesture receiving display in accordance with one embodiment of the present invention.

Method 700 of FIG. 7 illustrates system operation once a gesture is interpreted to be a transpose gesture in method 300 of FIG. 3. Method 700 begins with start step 705. Next, display D0 in which the transpose gesture was received determines if there is a neighboring display D1 in the direction in which the transpose action is to be performed. If no neighboring device is detected in the transpose direction at step 710, operation continues to step 740. If a neighboring device in the transpose direction is detected at step 710, operation continues to step 720. In another embodiment not illustrated in method 700, whether display D0 attempts to determine if a neighbor is present depends on the gesture. Thus, a first type of transpose gesture may require a transpose operation with a neighboring display and a second type of transpose gesture may require a transpose operation with the display stack. In this embodiment, operation of method 700 would proceed accordingly.

At step 740, display D0 pulls content from the D0 stack. The content displayed on display D0 at the time the transpose gesture input was received is then pushed to the top of the D0 stack at step 750. Operation of method 700 then continues to step 760.

At step 720, the neighboring display D1 in the transpose direction is sent a transpose request message from display D0 at step 720. In one embodiment, the transpose request message includes display identification information for display D0 and content identification information. Display D0 then receives a transpose response message at step 730. In one embodiment, the transpose response includes display identification information and content identification information. The identification information is associated with the same display D1 the transpose request message was sent to in step 720. The content identification information is information regarding the content displayed on display D1 when it received the transpose request message. Operation of method 700 then continues to step 760 where display D0 is updated. Display D0 is updated by presenting the content associated with the content information received from display D1. The content information previously displayed by display D0 is now provided to display D1 for display or to the D0 stack. Operation of method 700 then ends at step 765.

Figure 8:
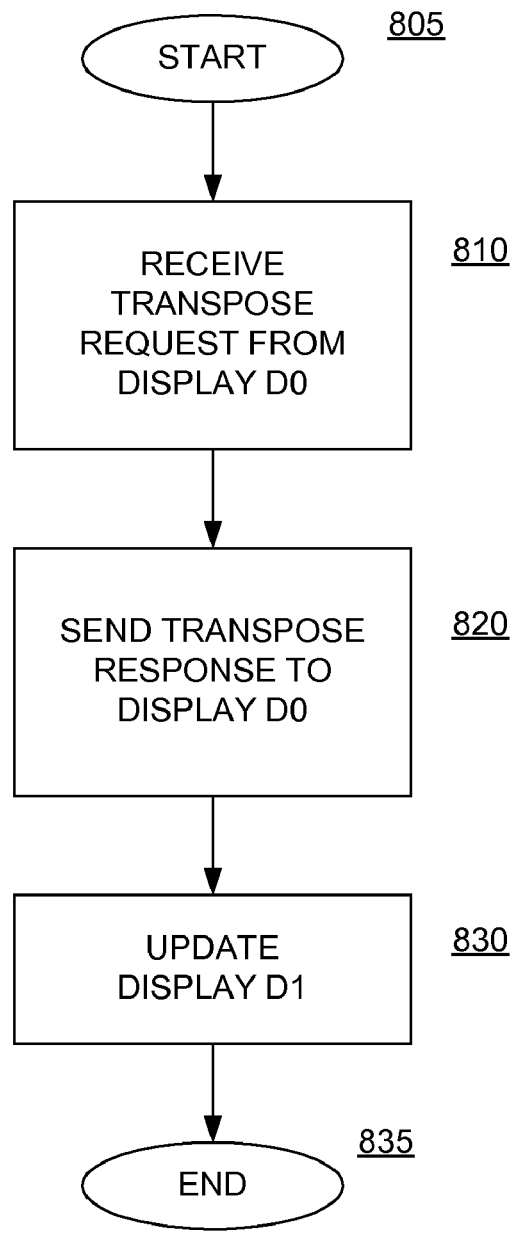
FIG. 8 is an illustration of a method for implementing propagation in response to a transpose gesture in accordance with one embodiment of the present invention.

As mentioned with respect to the embodiment illustrated in method 700, a display D0 subject to a transpose gesture will attempt to transpose content with a display D1 in the direction of the transpose gesture. Method 800 of FIG. 8 illustrates the operation of a display D1 that receives a transpose request from a display D0. Method 800 begins with start step 805. Next, the display D1 receives a transpose request from display D0 at step 810. In one embodiment, the transpose request includes display identification information for display D0 and content identification information for display D0 at the time the transpose gesture was received. A transpose response is sent to display D0 from display D1 at step 820. In one embodiment, the transpose response includes display identification information for display D1 and content information for display D1 at the time the transpose request message was received by D1. After the response message is transmitted, display D1 is updated to present the content associated with the content information received in the transpose request received at step 810 from display D0 as shown in step 830. Operation then ends at step 835.

The MPS of the present invention may have several other operating features in addition to those discussed above. For example, a display may be configured to mirror another display, i.e. to present identical content as another display. This feature may be useful for presenting content to large conference rooms or in different locations. In this case, whenever the content for a particular display changes, the associated display would also change to the same content.

Another feature may involve multiple display feeding. This feature may be described with reference to FIG. 2, assuming that display D4 is a laptop and displays D0, D1, and D2, which are stationary displays on a wall. A presenter may wish to provide new content to each of the displays D0-D2. In this case, a move up flicking gesture input may be received by display D4. The flicking gesture can be made while the laptop is directly in front of the displays or in some other position. Upon interpreting this type of flicking gesture, display D4 will provide content directly to displays D0-D2 simultaneously. The content can be retrieved from a stack associated with display D4 (not shown in FIG. 2).

Group permissions and security can be employed for one or more displays to control and restrict communication between displays. This may include restricting from where a display will accept new content, to whom a display will provide content, and other actions. In one embodiment, command propagation is restricted to occur only among displays in the same group.

In an embodiment, displays can be implemented using laptop computers, PDAs, and other mobile devices. In this case, each mobile device will include a location sensing mechanism, such as one utilizing BlueTooth™ technology, ultrasonic technology, or a GPS-type sensor. In this embodiment, as a mobile display changed location, it would provide updated location information to other displays through the peer-to-peer network. Alternatively, different sensors mechanisms such as IR sensors or RF tags may be used to determine the location of a mobile device within an environment. For example, an RF tag could be attached to the mobile device within a conference room. Within the conference room at different possible display locations, such as different seats in a conference room, RF scanners could be installed. As the mobile display was brought to a different position in the room, the user of the mobile display could scan the device to indicate it's current location. In this embodiment, the default direction for the device could be with the screen facing the user or the front of the room, and gestures could be configured to work accordingly based on the direction of the display the gesture relates to. In an embodiment where location and orientation sensing systems are used, the orientation and location of a mobile device may be calculated. In this case, gestures would be interpreted based on the current location and orientation of the mobile display.

In one embodiment, annotation may be used by audience members in a presentation to share ideas. In this embodiment, one or more main displays may be located before an audience. Additionally, the audience members would each have a display within the peer-to-peer system. When content was presented on one of the main displays, an audience member could retrieve the content with the appropriate gesture (typically a "move down" gesture, having the effect of copying the content in the main display). The member could then annotate the content and push the new content with annotations to the main display. The MPS in this embodiment may be configured with passwords and security settings to allow all or selected audience members to push and pull content from a main display.

As mentioned above, a mobile device such as a PDA, laptop computer, notebook PC, and other mobile computing devices may be used as mobile displays in accordance with one embodiment of the present invention. As discussed above, the mobile devices may be used to retrieve copies of content presented on other displays. Additionally, the mobile devices may be used to provide annotation to retrieved content and then transmit the content back to the display for viewing by the group. In this manner, a user in control of a personal display may interact with a public display in a conference room meeting, class, or some other interactive group environment. This is advantageous because unlike a presenter who can make direct physical contact with the wall displays, a member of the audience is often discouraged by social conventions and time considerations from walking up to a wall display to make a contribution to a presentation.

Though particular gestures have been described above, the system of the present invention may be configured to operate upon the recognition of many types of gestures received through many types of input devices. Further, different gestures may be configured to perform different actions, all within the scope of the present invention.

A peer-to-peer modular presentation system (MPS) is disclosed for providing improved presentations. The system includes a plurality of displays. The plurality of displays may include static or mobile displays. In one embodiment, the static displays are screens suitable for displaying content, such as video monitors, plasma displays, overhead projectors, or other display mechanisms. The mobile displays may be any type of mobile display suitable for presenting content as displayed in the static displays, including laptop computers, notebook PCs, PDAs, cell phones, and other mobile devices with a display. The displays communicate with each other within a peer-to-peer type system in which there is no central server. In one embodiment, each display is aware of the displays immediately surrounding it. A propagation direction may be configured for at least two of the displays in the system. In an embodiment, a presenter may move content between displays by generating a gesture input at one display. The gesture input will initiate new content to be displayed in the particular display, and initiate propagation of content along the configured direction in neighboring displays. Content may be fed to a particular display through a stack that is associated with the display.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, presenting content in a peer-to-peer modular presentation system.

The invention claimed is:

1. A system for providing a sequence of content in a peer-to-peer modular presentation system, comprising:
a plurality of display devices, wherein each display device includes a corresponding plurality of a processor and memory system to control each corresponding display device, and wherein each display device neighbors at least one other display device and at least three of the plurality of display devices are in visual proximity to each other, and wherein each display device communicates within a peer-to-peer network;
an input device that receives input of a gesture to move a first content from a first display device of the plurality of display devices to a second display device, wherein a second content of the second display device is moved from the second display device of the plurality of display devices to a third display device, wherein a propagation order of a third content followed by the second content followed by the first content represents a sequence; and
wherein the processor corresponding to the first display device
interprets a direction to move the first content from the first display device based on the gesture, wherein the gesture is made with a flick which indicates content to be moved and a direction without designating a destination display device,
determines the destination display device to which the first content is to be moved, based on the direction indicated by the gesture and the position of the plurality of display devices, wherein the destination display device is the second display device,
establishes a peer-to-peer connection between the first display device, the second display device, and the third display device,
propagates the first content of the first display device to the second display device using the peer-to-peer connection,
instructs the second display device to propagate the second content of the second display device to the third display device using the peer-to-peer connection, wherein the third display device is determined based on the direction indicated by the gesture, and
wherein initiating the gesture changes the content displayed on all of the first display device, the second display device and the third display device.

2. The system of claim 1 wherein each of the plurality of display devices is configured to:
receive new content identification information;
transmit old content identification information; and
present content associated with the new content identification information.

3. The system of claim 2 wherein new content identification information is received from a processor associated with a neighboring display device in the reverse propagation direction, the old content identification information is transmitted to a processor associated with a neighboring display device in the forward propagation direction, the forward propagation direction derived from the gesture input.

4. The system of claim 2 wherein receiving new content identification information includes:
retrieving new content identification information from a memory stack.

5. A method of providing content in a peer-to-peer modular presentation system, the method comprising:
providing having a plurality of display devices, wherein each display device includes a corresponding plurality of a processor and memory system to control each corresponding display device, and wherein at least three of the plurality of display devices are in visual proximity to each other, and wherein each display device communicates within a peer-to-peer network; the method comprising:
receiving input of a gesture to move a sequence of content including a first content and a second content, wherein the first content is presented on a first display device of the plurality of display devices, wherein the gesture initiates propagation of content from right to left which indicates content to be moved and a direction without designating a destination display device;
interpreting a direction to move the first content from the first display device based on the gesture;
determining the destination display device to which the first content is to be moved based on the direction indicated by the gesture and the relative position of the plurality of display devices, wherein the destination display device is a second display device, and determining a third display device to which the second content is to be moved based on the direction indicated by the gesture and the relative position of the plurality of display devices, wherein the first display device is on the right of the second display device and the second display device is on the right of the third display device;
establishing a peer-to-peer connection between the first display device, the second display device, and the third display device;
propagating the first content of the first display device to the second display device using the peer-to-peer connection,
propagating the second content of the second display device to the third display device using the peer-to-peer connection, and
presenting the first content at the second display device and the second content at the third display device, wherein initiating the gesture simultaneously changes the content displayed at both the first display device, the second display device and the third display device.

6. The method of claim 5 wherein receiving gesture input includes:
receiving input on a touch screen display.

7. The method of claim 5 wherein presenting the second content at the third display device includes retrieving a second URL and sending the second URL to the third display device.

8. The method of claim 5 wherein presenting the first content at the second display device includes sending a first URL to the second display device.

9. A computer readable medium with instructions for execution by a computer for providing a sequence of content in a peer-to-peer modular presentation system, wherein the instructions, when executed by the computer, cause the computer to execute the steps of:
providing having a plurality of display devices, wherein each display device includes a corresponding plurality of a processor and memory system to control each corresponding display device, and wherein at least three of the plurality of display devices are in physical and visual proximity to each other, wherein each display device communicates within a peer-to-peer network; the instructions comprising:

receiving input of a gesture to move a first content presented on a first display device, wherein the gesture indicates content to be moved and a direction without designating a destination display device, and wherein the first content is all the information displayed on the first display device, and wherein a second content of the second display device is moved from the second display device of the plurality of display devices to a thrid display device, wherein a propagation order of a third content followed by the second content followed by the first content represents a sequence;

interpreting a direction to move the content from the first display device based on the gesture;

determining the destination display device to which the first content is to be moved based on the direction indicated by the gesture and the relative position of the plurality of display devices, wherein the destination display device is a second display device;

establishing a peer-to-peer connection between the first display device, the second display device, and the third display device;

propagating the first content of the first display device to the second display device using the peer-to-peer connection;

propagating the second content of the second display device to the third display device using the peer-to-peer connection; and presenting the first content at the second display device, wherein a propagation order of the second content followed by the first content represents the sequence, wherein initiating the gesture simultaneously changes the content displayed at both the first display device, the second display device, and the third display device.

10. The computer readable medium of claim 9 wherein receiving input of the gesture includes:

receiving input on a touch screen display.

11. The computer readable medium of claim 9 wherein presenting the first content at the second display device includes sending a first URL to the second display device.

12. The system of claim 1, wherein the content of the third display device is automatically propagated on another display device in the plurality of display devices.

13. The method of claim 5, wherein the content of the third display device is automatically presented to another display device in the plurality of display devices.

14. The computer readable medium of claim 9, wherein the instructions further provide for the second content of the second display device to be automatically presented to a third display device in the plurality of display devices.

15. The computer readable medium of claim 9, wherein the instructions further provide that a third display device is in visual proximity to both the first display device and the second display device.

16. The computer readable medium of claim 15, wherein the instructions further provide that a content of the third display device is automatically presented to another display device in the plurality of display devices.

17. The computer readable medium of claim 11, wherein the instructions further provide that presenting the second content at a third display device includes retrieving a second URL and sending the second URL to the third display device.

18. A system for providing content in a peer-to-peer modular presentation system, comprising:

a plurality of display devices, wherein each display device includes a corresponding plurality of a processor and memory system to control each corresponding display device, and wherein each display device neighbors at least one other display device, wherein each display device is aware of the neighboring display devices, wherein each display device remains a discrete separately controlled display device, and wherein each display device communicates within a peer-to-peer network;

a sequence of content including a first content and a second content;

an input device that receives input of a gesture to move a content from a first display device of the plurality of display devices, wherein the gesture is a movement from right to left using a finger, wherein the movement from right to left specifies a starting point and a direction; and wherein the processor corresponding to the first display device, interprets a direction to move the first content from the first display device based on the gesture, wherein the gesture does not designate a destination display device, determines the destination display device to which the first content is to be moved, based on the direction indicated by the gesture and the position of the plurality of display devices, wherein the destination display device is a second display device, establishes a peer-to-peer connection between the first display device, the second display device, and instructs the second display device to establish the peer-to-peer connection with the third display device, instructs the second display device to propagate propagates the first content of the first display device to the second display device using the peer-to-peer connection, and automatically propagates the second content of the second display device to a third display device of the plurality of display devices using the peer-to-peer connection, wherein a propagation order of the second content followed by the first content represents the sequence, wherein initiating the gesture changes the content displayed on all of the first display device, the second display device and the third display device.

19. The system of claim 1, wherein the gesture is made from a device selected from the group consisting of keyboards, mouse devices, joysticks, microphones, UV sensors, motion detectors and laser pointers.

20. The method of claim 5, wherein the gesture is made from a device selected from the group consisting of keyboards, mouse devices, joysticks, microphones, UV sensors, motion detectors and laser pointers.

21. The computer readable medium of claim 9, wherein the gesture is made from a device selected from the group consisting of keyboards, mouse devices, joysticks, microphones, UV sensors, motion detectors and laser pointers.

22. The system of claim 18, wherein the gesture is made from a device selected from the group consisting of keyboards, mouse devices, joysticks, microphones, UV sensors, motion detectors and laser pointers.

23. The system of claim 1, wherein the at least three display devices in visual proximity to each communicate through a server.

24. The method of claim 5, wherein the at least three display devices in visual proximity to each communicate through a server.

25. The system of claim 18, wherein the first display device, the second display device and the third display device each communicate through a server.

26. The system of claim 1, wherein the at least three display devices in visual proximity to each communicate through a peer to peer service.

27. The method of claim 5, wherein the at least three display devices in visual proximity to each communicate through a peer to peer service.

28. The system of claim 18, wherein the first display device, the second display device and the third display device each communicate through a peer to peer service.

* * * * *